United States Patent [19]
Faris et al.

[11] Patent Number: 6,148,177
[45] Date of Patent: *Nov. 14, 2000

[54] SUBSCRIBER UNIT AND METHOD FOR LINKING A MESSAGE TO AN APPLICATION

[75] Inventors: Randi Weitzen Faris, Boca Raton; Therese Gearhart, Delray Beach, both of Fla.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 09/062,626

[22] Filed: Apr. 20, 1998

[51] Int. Cl.[7] ............................. H04Q 7/00; H04B 7/20; H04B 1/38
[52] U.S. Cl. ..................... 455/31.1; 455/458; 455/550
[58] Field of Search ................... 455/31.1, 31.2, 455/31.3, 458, 550, 466; 340/825.44

[56] References Cited

U.S. PATENT DOCUMENTS

| | | | |
|---|---|---|---|
| 5,404,529 | 4/1995 | Chernikoff et al. | 709/303 |
| 5,422,733 | 6/1995 | Merchant et al. | 358/407 |
| 5,430,436 | 7/1995 | Fennell | 340/825.44 |
| 5,581,244 | 12/1996 | Jokimies et al. | 340/825.44 |
| 5,684,865 | 11/1997 | Mohtashemi et al. | 379/100 |
| 5,870,479 | 2/1999 | Feiken et al. | 380/49 |
| 5,884,248 | 3/1999 | Hall | 455/31.2 |
| 5,898,385 | 4/1999 | Makino | 340/825.44 |

*Primary Examiner*—Reinhard J. Eisenzopf
*Assistant Examiner*—Charles N. Appiah
*Attorney, Agent, or Firm*—Randi L. Dulaney

[57] ABSTRACT

A special function application (32) within a wireless subscriber unit (10) operates using information contained in segments of a received message (14). The information included in the received message (14) can be used in more than one special function application (32) to meet multiple end-user needs.

12 Claims, 4 Drawing Sheets

SUBSCRIBER UNIT AND METHOD FOR LINKING A MESSAGE TO AN APPLICATION

FIELD OF THE INVENTION

This invention pertains to wireless subscriber units which contain at least one special function application.

BACKGROUND OF THE INVENTION

Historically, wireless subscriber units have had the ability to receive a message, and perform standard functions in response to the message receipt such as storing the message, displaying the message, or alerting the user of receipt of the message.

Today's wireless subscriber units are no longer restricted to just these standard functions. Manufacturers of wireless subscriber units are now adding special function applications such as address books, schedulers, stock managers, weather alerts, traffic reports and news briefs to their standard messaging capability. Some devices can even access the Internet for sending e-mail and browsing World Wide Web pages.

One drawback of today's wireless subscriber units is the inability to modify a portion of a received message and use that modified portion in the operation of the special function applications. As the special function applications become more prevalent in the industry, and become more critical as a business tool, the requirement for such a capability increases.

DESCRIPTION OF THE PREFERRED EMBODIMENT

Figure 1:
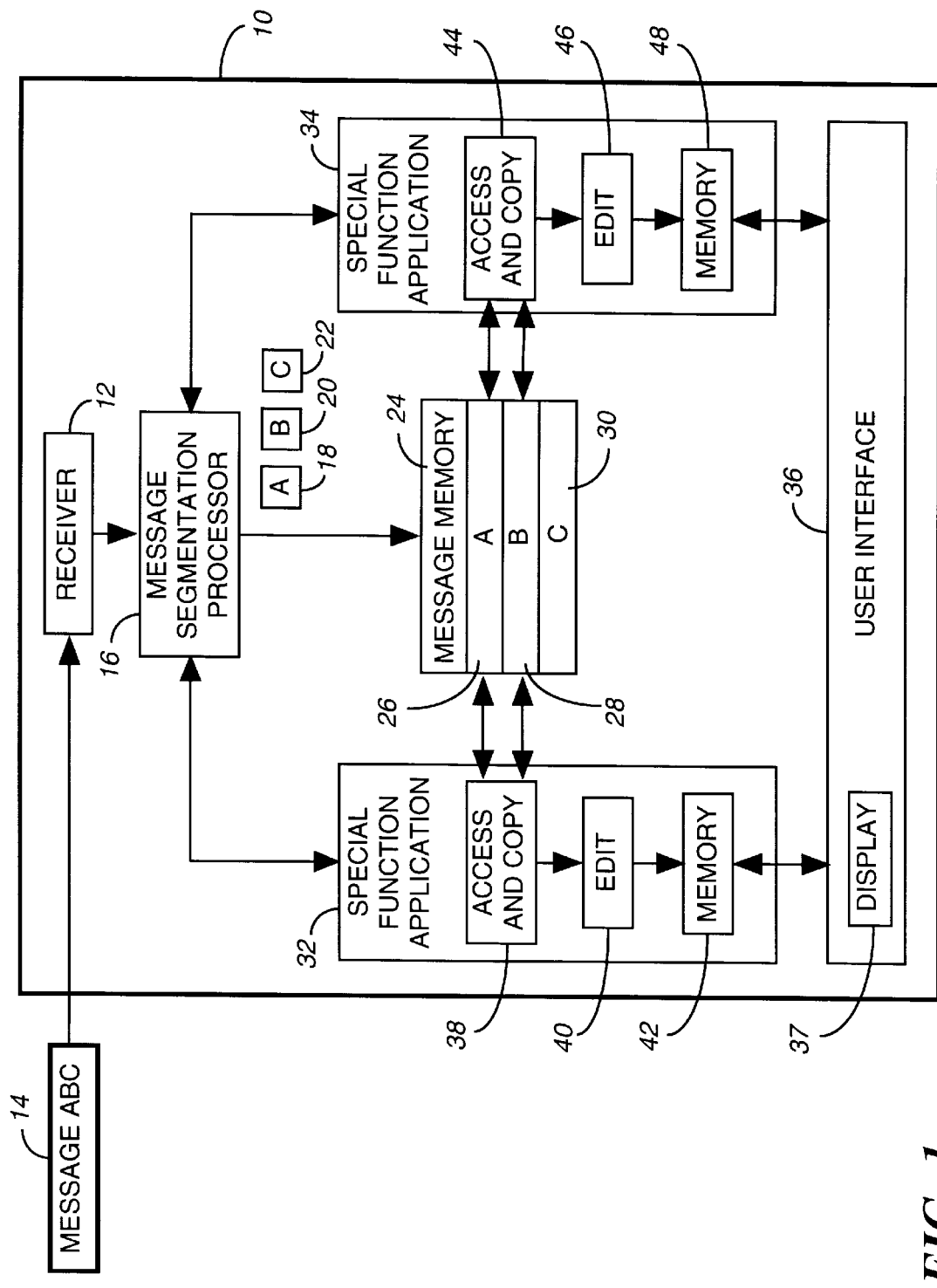
FIG. 1 is an electrical block diagram of a wireless subscriber unit that operates in accordance with the invention.

FIG. 1 is an electrical block diagram of a wireless subscriber unit 10 that operates in accordance with the invention. The wireless subscriber unit 10, may be, for example, a selective call receiver, such as a pager, or other form of RF (radio frequency) receiver or transceiver that is subscribed to a messaging service.

The wireless subscriber unit 10 contains a receiver 12 for receiving and processing the message 14. The receiver 12 may consist of a combination of hardware and software elements, employing conventional demodulation techniques for receiving and demodulating the received message 14, and conventional signal processing techniques for processing the message 14. The message processing may include decrypting the message 14, decompressing the message 14, and displaying the message 14. Preferably, the processing within the receiver is done by a processor similar to the M68HC11 micro-controller manufactured by Motorola, Inc. It will be appreciated that other similar processors can be utilized to accomplish the same functionality.

Coupled to the receiver 12 is a message segmentation processor 16 for selectively partitioning the received messages into the message segments 18, 20, and 22. The received message segments 18, 20, and 22 are stored in a message memory 24 having the discrete memory locations 26, 28, and 30 for storing the received message segments 18, 20, and 22 respectively.

In a preferred embodiment, one or more special function applications 32 and 34 are coupled to the discrete memory locations 26, 28, and 30 of the message memory 24 for accessing and operating on the stored message segments 18, 20, and 22. Preferably, the special function applications 32 and 34 are coupled to a user interface 36 which includes a display 37.

Selectively partitioning a message 14 and storing the partitioned message segments 18, 20, and 22 enables new opportunities for added wireless subscriber unit 10 functionality and value, creating a more useful tool than conventional wireless subscriber units.

The special function application 32 contains an access and copy function 38 for accessing the discrete memory locations 26, 28, and 30 of the message memory 24 and copying the message segments 18, 20, and 22, an edit function 40 coupled to the access and copy function 38 for modifying the copied message segment for use in the operation of the special function application 32, and an application memory 42 for storage of the modified message segments. Preferably, the operation of the special function application 32 is done by logic programmed into a microprocessor such as a MC68328 microprocessor made by Motorola, Inc.

The special function application 34 contains an access and copy function 44 for accessing the discrete memory locations 26, 28, and 30 of the message memory 24 and copying the message segments 18, 20, and 22, an edit function 46 coupled to the access and copy function 44 for modifying the copied message segment for use in the operation of the special function application 34, and an application memory 48 for storage of the modified message segments. Preferably, the operation of the special function application 34 is done by logic programmed into a microprocessor such as a MC68328 microprocessor made by Motorola, Inc.

The capability for more than one special function application to access and utilize the same message segment from the same discrete message memory location simultaneously increases the value of the wireless subscriber unit 10 over conventional wireless subscriber units which can only access an entire message by a single function.

The special function applications 32 and 34 may be, for example, personal information management applications such as a phone directory or a calendar application. The special function applications 32 and 34 may also be vertical market applications such as real estate, medical data, and stock market applications.

Figure 2:
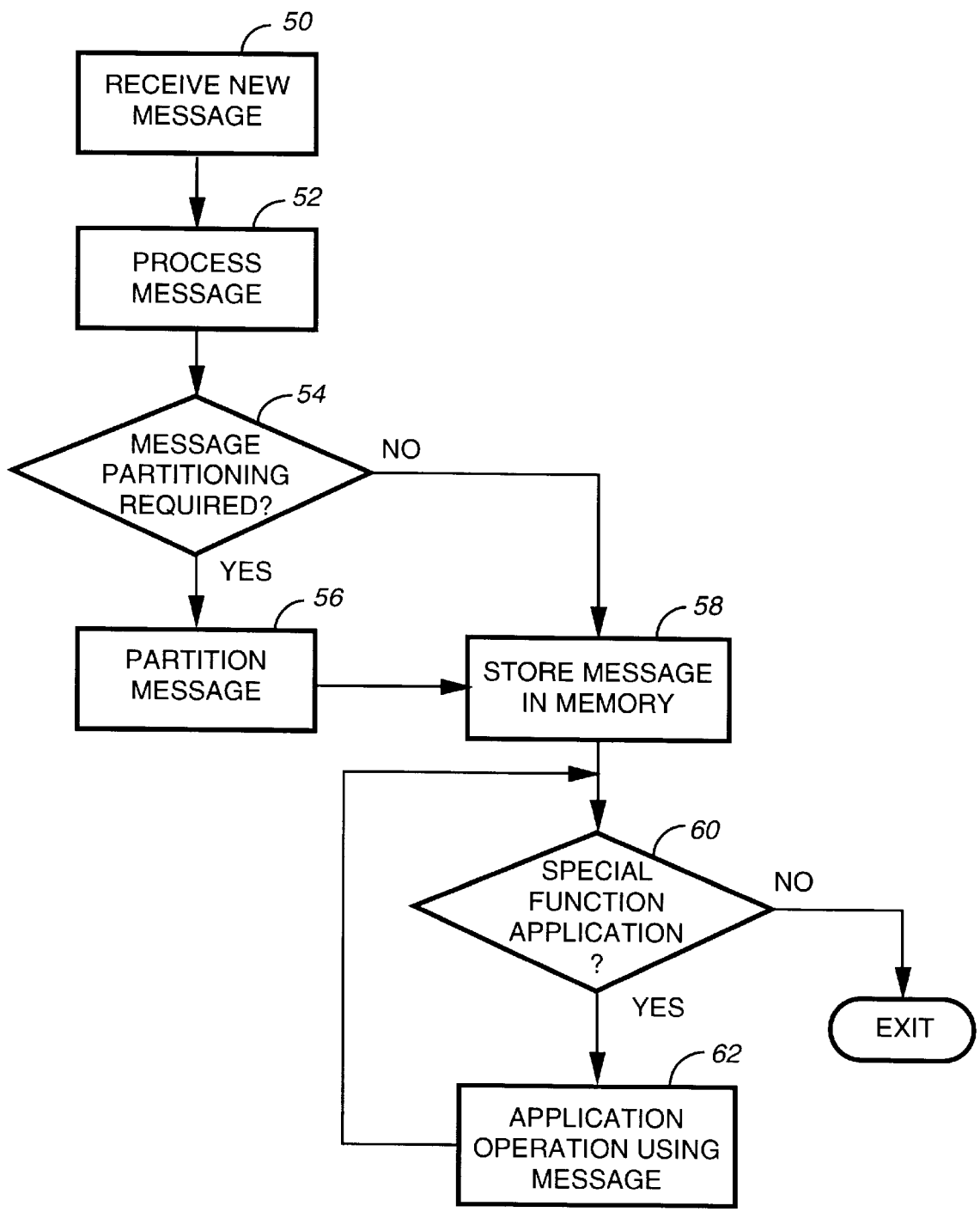
FIG. 2 is a flow chart illustrating the operation of the wireless subscriber unit shown in FIG. 1.

FIG. 2 is a flow chart illustrating the operation of the wireless subscriber unit 10 shown in FIG. 1 in accordance with the invention. In step 50, a message 14 is received by the receiver 12 of the wireless subscriber unit 10. In step 52, the message 14 is processed by the receiver 12. Next, in step 54, the message segmentation processor 16 checks for a requirement for this message 14 to be partitioned. In a preferred embodiment, special function applications 32 and 34 inform the message segmentation processor 16 of the message partitioning requirements. Preferably, the operation of the message segmentation processor 16 is done by logic programmed into a microprocessor such as a MC68328 microprocessor made by Motorola, Inc.

If no message partitioning requirement exists for the received message 14, the received message 14 is stored in the message memory 24 (step 58). If a message partitioning requirement exists for received message 14, the message segmentation processor 16 partitions the message into segments (step 56) and each segment is stored in its own discrete memory location in the message memory 24 (step 58). For example, if in the received message 14 of FIG. 1 "ABC" was "Call Fred 555-1234", and the message partitioning requirement was for the message 14 to be broken up into separate words, the message segmentation processor 16 would break up "Call Fred 555-1234" into A equals Call (18), B equals Fred (20), and C equals 555-1234 (22) and store the message segments 18, 20, and 22 in the discrete memory locations 26, 28, and 30 respectively. Once the received message 14 or the message segments 18, 20, or 22 has been stored, in step 60 the system checks for a requirement to use the stored message in a special function application such as 32 or 34 of FIG. 1. If no such requirement exists, the process is exited. If a requirement exists by a special function application, such as the special function application 32, the special function application 32 performs its programmed operation using the stored message, such as the message segment 18 located in the discrete memory location 26 (step 62). The system then returns to step 60 and checks for another special function application requiring the stored message segment, repeating the process until all special function applications requiring the use of the stored message segment have been operated.

In this manner, multiple special function applications can use one or more segments of the same message in performing programmed operations to provide value to the subscriber unit owner.

Figure 3:
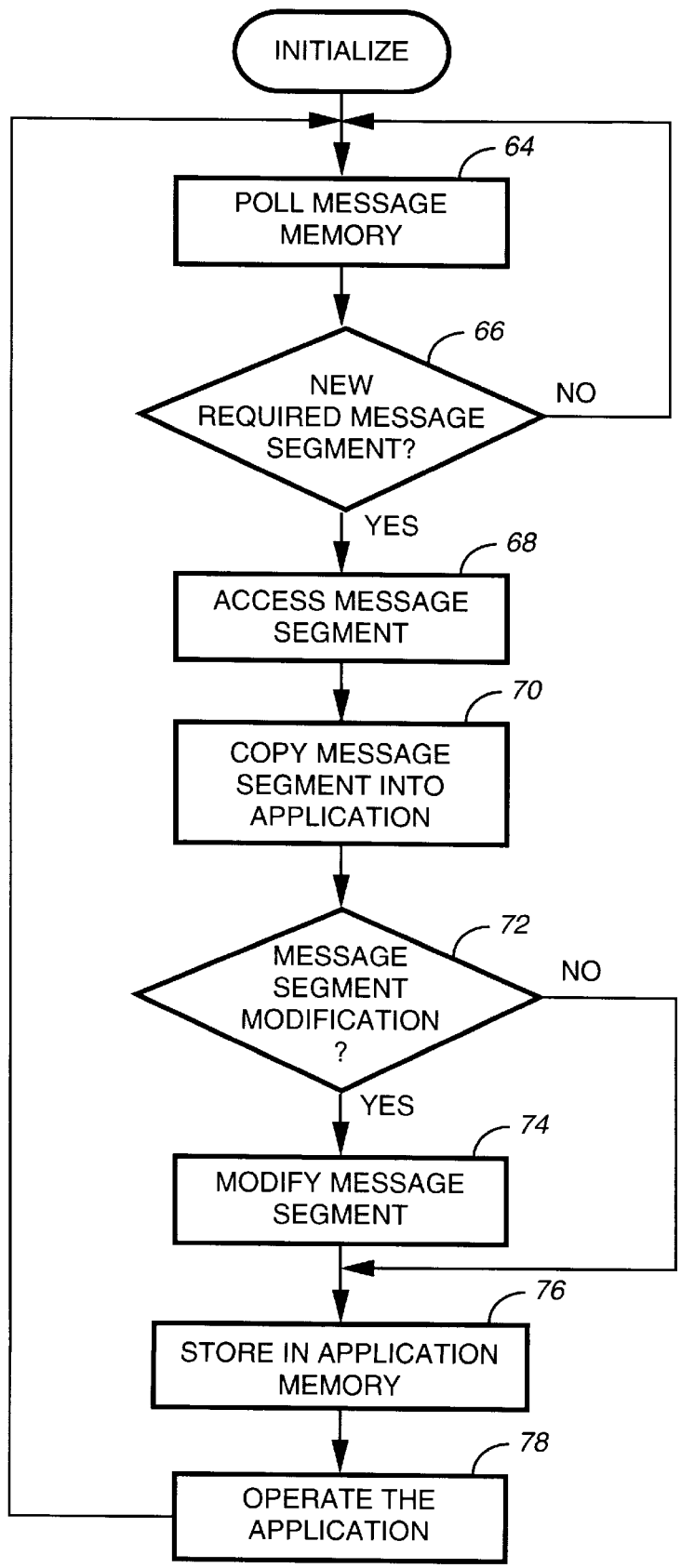
FIG. 3 is a flow chart illustrating more detail of certain steps shown in FIG. 2.

FIG. 3 is a flow chart illustrating more detail of the operation of the special function application 32 in step 62 of FIG. 2. In step 64, the special function application 32 polls the message memory 24, checking for the availability of any new message segments, such as message segment 18 stored in discrete memory location 26 of the message memory 24, required for the operation of the special function application 32 (step 66). If no new required message segments have been stored, the special function application 32 continues to periodically poll the message memory 24. If a new required message segment 18 has been stored, the access and copy function 38 of the special function application 32 accesses the discrete memory location 26 containing the message segment 18, (step 68), and copies the message segment 18 into the special function application 32 (step 70). The special function application 32 then checks for any requirements for modification of the message segment 18 (step 72). If no modifications are required, the message segment 18 is stored in the application memory 42 and used in the operation of the special function application 32. If a modification is required, the modification is processed (step 74) by the edit function 40, and then the modified message segment 18 is stored in application memory 42 (step 76) and used in the operation of the special function application 32 (step 78).

Figure 4:
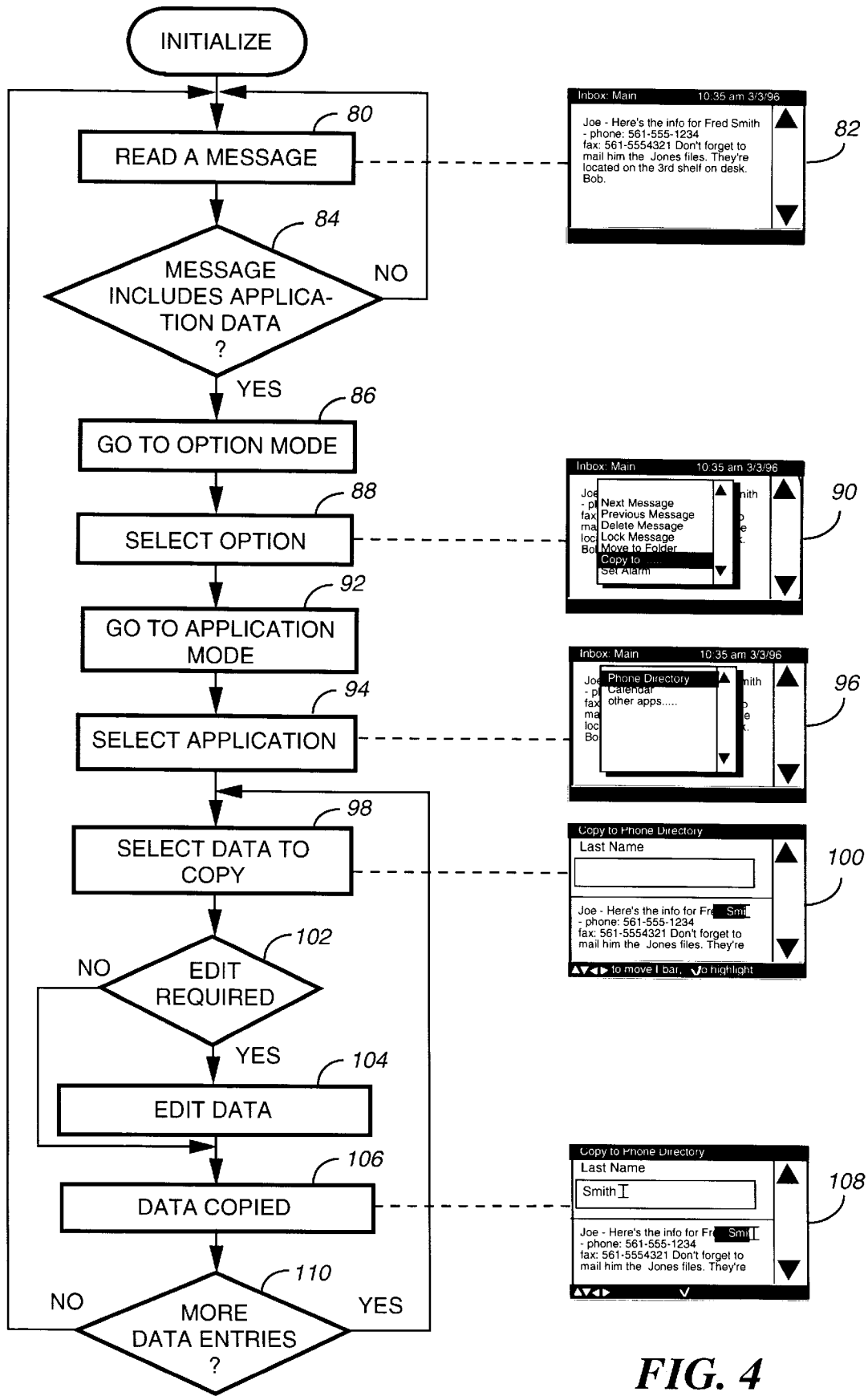
FIG. 4 is an illustration of a user interface which uses functionality of the invention.

FIG. 4 illustrates a user interface of a wireless subscriber unit 10 for copying message data (message segment 18) into a phone directory (special function application 32) by using the described invention. In step 80, a message 14 is read on the wireless subscriber unit's 10 display 37 (illustration 82). The end user then checks the message 14 for message data which can be used by a special function application 32. In the example, the message data used by the phone directory application includes a name or a phone number. If the message 14 does not include any data that can be used by one or more special function applications 32, the end user continues reading messages. If the message does include useable data, the end user enables the option mode (step 86).

Once in option mode, the end user can select the option to be used in the linking of the message data and the special function application 32. In the illustration 90, the copy mode option is chosen. Next, in step 92, the end user goes to the application selection mode, and selects the special function application 32 to be used (step 94). In the illustration 96, the phone directory application is chosen. The end user then selects the data within the viewed message to copy into the application (step 98). In illustration 100, the data chosen is the name Smith. In step 102, the end user determines if the chosen data requires editing. If the data does require editing, the data is edited (step 104). Once the data no longer requires editing, the data is copied into the application (step 106). Illustration 108 shows the data "Smith" copied into the phone directory under the last name field of the phone directory application. The end user then determines if any more data entries are required (step 110). If no more data entries are required, the end user goes back to reading messages. If more data entries are required, the end user returns to step 98 and selects next data entry to copy.

The ability to copy and modify segments of the received messages into the special function applications 32 and 34 in a wireless subscriber unit 10 allows the creation of unique solutions to meet market needs. This ability adds simplicity, efficiency, and control to the lives of the wireless subscriber unit's 10 owners.

Although the invention has been described in terms of preferred embodiments, it will be obvious to those skilled in the art that various alterations and modifications may be made without departing from the invention. Accordingly, it is intended that all such alterations and modifications be considered as within the spirit and scope of the invention as defined by the appended claims.

What is claimed is:

1. In a wireless subscriber unit having a receiver for receiving and processing messages, a memory having discrete memory locations for storing messages, and at least one special function application, a method for linking a message to a special function application, comprising:

receiving and processing a message;

partitioning the message into a first message segment and a second message segment in response to a partitioning requirement, wherein the partitioning requirement is generated by the special function application;

storing the first message segment in a first discrete memory location;

storing the second message segment in a second discrete memory location;

accessing the first discrete memory location by the special function application;

operating the special function application using the first message segment contained in the accessed first discrete memory location when the information contained in the first message segment is processable by the special function application; and suspending operation of the special function application when the information contained in the first message segment is not processable by the special function application.

2. A method as recited in claim 1, wherein the special function application accesses the discrete memory location directly.

3. A method as recited in claim 1, wherein the wireless subscriber unit includes a user interface, and further wherein the step of operating the special function application includes:

copying the first message segment from the first discrete memory location into the special function application;

modifying the first message segment in response to the user interface; and storing the modified first message segment within the special function application.

4. In a wireless subscriber unit having a receiver for receiving and processing messages, a memory having discrete memory locations for storing messages, a first special function application, and a second special function application, a method for linking a message to the first and second special function applications, comprising:

receiving and processing a message;

storing the message in a discrete memory location;

simultaneously accessing the discrete memory location by the first special function application and the second special function application;

simultaneously operating the first special function application and the second special function application using the message contained in the discrete memory location when the information contained in the message is processable by the first special function application and the second special function application;

suspending operation of the first special function application when the information contained in the message is not processable by the first special function application; and suspending operation of the second special function application when the information contained in the message is not processable by the second special function application.

5. A method as recited in claim 4, wherein the discrete memory location has an identity, and further comprising:

informing the second special function application of the identity of the discrete memory location by the first special function application.

6. A method as recited in claim 4, wherein the wireless subscriber unit includes a user interface, and further wherein the step of operating the first special function application includes:

copying the message from the discrete memory location into the first special function application;

modifying the message in response to the user interface; and storing the modified message within the first special function application.

7. A method as recited in claim 4, wherein the wireless subscriber unit includes a user interface, and further wherein the step of operating the second special function application includes:

copying the message from the discrete memory location into the second special function application;

modifying the message in response to the user interface; and storing the modified message within the second special function application.

8. A method as recited in claim 4, further comprising partitioning the message into multiple message segments and storing a number of message segments in a corresponding number of discrete memory locations.

9. A wireless subscriber unit capable of receiving and storing messages, comprising:

a receiver for receiving and processing a message;

a message segmentation processor coupled to the receiver for partitioning a message into a first message segment and a second message segment in response to a partitioning requirement;

a message memory coupled to the message segmentation processor having a first discrete memory location for storing the first message segment and a second discrete memory location for storing the second message segment;

a first special function application coupled to the message memory and coupled to the message segmentation processor, for informing the message segmentation processor of the partitioning requirement, and further for accessing and operating on the stored first message segment when the information contained in the first message segment is processable by the first special function application, wherein the operation of the first special function application is suspended when the information contained in the first message segment is not processable by the first special function application; and a second special function application coupled to the message memory and coupled to the message segmentation processor, for accessing and operating on the stored first message segment when the information contained in the first message segment is processable by the second special function application, wherein the operation of the second special function application is suspended when the information contained in the first message segment is not processable by the second special function application.

10. A wireless subscriber unit capable of receiving and storing messages, comprising:

a receiver for receiving and processing a message;

a message segmentation processor coupled to the receiver for partitioning a message into a first message segment in response to a first partitioning requirement and a second message segment in response to a second partitioning requirement;

a message memory coupled to the message segmentation processor having a first discrete memory location for storing the first message segment and a second discrete memory location for storing the second message segment;

a first special function application coupled to the message memory and coupled to the message segmentation processor, for informing the message segmentation processor of the first partitioning requirement, and further for accessing and operating on the stored first message segment when the information contained in the first message segment is processable by the first special function application, wherein the operation of the first special function application is suspended when the information contained in the first message segment is not processable by the first special function application; and a second special function application coupled to the message memory and coupled to the message segmentation processor, for informing the message segmentation processor of the second partitioning requirement, and further for accessing and operating on the stored second message segment when the information contained in the second message segment is processable by the second special function application, wherein the operation of the second special function application is suspended when the information contained in the second message segment is not processable by the second special function application.

11. In a wireless subscriber unit having a receiver for receiving and processing messages, a memory having discrete memory locations for storing messages, a first special function application, and a second special function application, a method for linking a message to the first and second special function applications, comprising:

receiving and processing a message;

generating a first partitioning requirement by the first special function application and a second partitioning requirement by the second special function application;

partitioning the message into a first message segment in response to the first partitioning requirement and a second message segment in response to the second partitioning requirement;

storing the first message segment in a first discrete memory location;

storing the second message segment in a second discrete memory location;

accessing the first discrete memory location by the first special function application; and operating the first special function application using the first message segment contained in the accessed first discrete memory location when the information contained in the first message segment is processable by the first special function application;

suspending operation of the first special function application when the information contained in the first message segment is not processable by the first special function application;

accessing the second discrete memory location by the second special function application;

operating the second special function application using the second message segment contained in the accessed second discrete memory location when the information contained in the second message segment is processable by the second special function application; and suspending operation of the second special function application when the information contained in the second message segment is not processable by the second special function application.

12. In a wireless subscriber unit having a receiver for receiving and processing messages, a memory having discrete memory locations for storing messages, a first special function application and a second special function application, a method for linking a message to the first and second special function applications, comprising:

receiving and processing a message;

partitioning the message into a first message segment and a second message segment in response to a partitioning requirement, wherein the partitioning requirement is generated by the first special function application;

storing the first message segment in a first discrete memory location;

storing the second message segment in a second discrete memory location;

simultaneously accessing the first discrete memory location by the first special function application and the second special function application;

simultaneously operating the first special function application and the second special function application using the first message segment contained in the accessed first discrete memory location when the information contained in the first message segment is processable by the first special function application and the second special function application;

suspending operation of the first special function application when the information contained in the first message segment is not processable by the first special function application; and suspending operation of the second special function application when the information contained in the first message segment is not processable by the second special function application.

\* \* \* \* \*